United States Patent
Carlson

(10) Patent No.: US 7,260,217 B1
(45) Date of Patent: Aug. 21, 2007

(54) SPECULATIVE EXECUTION FOR DATA CIPHERING OPERATIONS

(75) Inventor: David A. Carlson, Haslet, TX (US)

(73) Assignee: Cavium Networks, Inc., Mountain View, CA (US)

( * ) Notice: Subject to any disclaimer, the term of this patent is extended or adjusted under 35 U.S.C. 154(b) by 598 days.

(21) Appl. No.: 10/092,328

(22) Filed: Mar. 6, 2002

Related U.S. Application Data

(60) Provisional application No. 60/361,247, filed on Mar. 1, 2002.

(51) Int. Cl.
*H04K 1/04* (2006.01)

(52) U.S. Cl. ............................................ 380/37; 380/36

(58) Field of Classification Search .................. 380/37; 712/239
See application file for complete search history.

(56) References Cited

U.S. PATENT DOCUMENTS

| | | | | | |
|---|---|---|---|---|---|
| 4,078,152 | A | * | 3/1978 | Tuckerman, III | ............. 380/37 |
| 5,016,275 | A | * | 5/1991 | Smith | ............. 380/43 |
| 5,301,235 | A | * | 4/1994 | Shimada | ............. 380/42 |
| 5,444,781 | A | * | 8/1995 | Lynn et al. | ............. 380/46 |
| 5,454,117 | A | * | 9/1995 | Puziol et al. | ............. 712/23 |
| 5,572,707 | A | | 11/1996 | Rozman et al. | |
| 5,754,812 | A | * | 5/1998 | Favor et al. | ............. 712/216 |
| 5,794,061 | A | * | 8/1998 | Hansen et al. | ............. 712/1 |
| 5,799,165 | A | * | 8/1998 | Favor et al. | ............. 712/214 |
| 5,801,975 | A | * | 9/1998 | Thayer et al. | ............. 708/402 |
| 5,826,073 | A | * | 10/1998 | Ben-Meir et al. | ............. 712/226 |
| 5,835,599 | A | * | 11/1998 | Buer | ............. 380/29 |
| 5,884,059 | A | * | 3/1999 | Favor et al. | ............. 712/215 |
| 5,919,256 | A | * | 7/1999 | Widigen et al. | ............. 712/218 |
| 5,926,642 | A | * | 7/1999 | Favor | ............. 712/1 |
| 6,047,372 | A | * | 4/2000 | Thayer et al. | ............. 712/222 |
| 6,061,521 | A | * | 5/2000 | Thayer et al. | ............. 712/9 |
| 6,154,831 | A | * | 11/2000 | Thayer et al. | ............. 712/208 |
| 6,185,304 | B1 | * | 2/2001 | Coppersmith et al. | ......... 380/37 |
| 6,185,679 | B1 | * | 2/2001 | Coppersmith et al. | ...... 713/150 |
| 6,189,095 | B1 | * | 2/2001 | Coppersmith et al. | ...... 713/150 |
| 6,192,129 | B1 | * | 2/2001 | Coppersmith et al. | ...... 380/259 |
| 6,195,744 | B1 | * | 2/2001 | Favor et al. | ................. 712/215 |
| 6,202,204 | B1 | | 3/2001 | Wu et al. | |
| 6,223,276 | B1 | * | 4/2001 | Lee et al. | ..................... 712/207 |
| 6,226,742 | B1 | | 5/2001 | Jakubowski et al. | |

(Continued)

OTHER PUBLICATIONS

Bruce Schneier, Doug Whiting, Fast Software Encryption: Designing Encryption Algorithms for Optimal Software Speed on the Intel Pentium Processor, Lecture Notes in Computer Science, vol. 1267, Jan. 1997, p. 242.*

(Continued)

*Primary Examiner*—Nasser Moazzami
*Assistant Examiner*—David Garcia Cervetti
(74) *Attorney, Agent, or Firm*—Blakely, Sokoloff, Taylor & Zafman LLP

(57) ABSTRACT

In one embodiment, a computer-implemented method comprises receiving a data cipher operation. The method also comprises processing the data cipher operation. The processing of the operation includes generating a number of portions of ciphertext from plaintext, wherein a load operation associated with the generating of at least one portion of the ciphertext executes prior to a store operation associated with the generating of a prior portion of the ciphertext.

13 Claims, 9 Drawing Sheets

U.S. PATENT DOCUMENTS

| | | | | |
|---|---|---|---|---|
| 6,243,470 | B1* | 6/2001 | Coppersmith et al. | 380/259 |
| 6,249,582 | B1* | 6/2001 | Gilley | 380/28 |
| 6,332,214 | B1 | 12/2001 | Wu | |
| 6,347,143 | B1* | 2/2002 | Goff et al. | 380/37 |
| 6,356,270 | B2* | 3/2002 | Pentkovski et al. | 345/530 |
| 6,369,813 | B2* | 4/2002 | Pentkovski et al. | 345/419 |
| 6,421,730 | B1* | 7/2002 | Narad et al. | 709/236 |
| 6,459,792 | B2* | 10/2002 | Ohmori et al. | 380/37 |
| 6,463,579 | B1 | 10/2002 | McKinsey | |
| 6,539,541 | B1 | 3/2003 | Geva | |
| 6,549,622 | B1* | 4/2003 | Matthews, Jr. | 380/29 |
| 6,598,156 | B1 | 7/2003 | Arora | |
| 6,643,745 | B1* | 11/2003 | Palanca et al. | 711/138 |
| 6,658,559 | B1 | 12/2003 | Arora et al. | |
| 6,658,578 | B1* | 12/2003 | Laurenti et al. | 713/324 |
| 6,681,317 | B1 | 1/2004 | Mathews | |
| 6,704,871 | B1* | 3/2004 | Kaplan et al. | 713/192 |
| 6,728,867 | B1 | 4/2004 | Kling | |
| 6,873,707 | B1* | 3/2005 | Batcher | 380/255 |
| 2001/0025341 | A1* | 9/2001 | Marshall | 713/176 |
| 2002/0004904 | A1* | 1/2002 | Blaker et al. | 713/190 |
| 2002/0194483 | A1* | 12/2002 | Wenocur et al. | 713/185 |
| 2002/0196935 | A1* | 12/2002 | Wenocur et al. | 380/37 |

OTHER PUBLICATIONS

Mosanya et al., CryptoBooster: A Reconfigurable and Modular Cryptographic Coprocessor, 1999, Springer Verlag Berlin, pp. 246-256.*

Wollinger et al., How Well Are High-End DSPs Suited for the AES Algorithms?, Apr. 2000, Texas Instrument.*

Shehata et al., VLSI Implementation of a High Speed Block-Cipher Module, 2001, IEEE.*

Chodowiec et al., Fast implementations of secret-key block ciphers using mixed inner- and outer-round pipelining, Feb. 2001, ACM.*

Hong et al., Hardware Design and Performance Extimation of the 128-bit Block Cipher CRYPTON, 1999, Springer-Verlag Berlin, pp. 49-60.*

McLoone et al., Single-Chip FPGA Implementation of the Advanced Encryption Standard Algorithm, 2001, Springer-Verlag Berlin, pp. 152-161.*

Moldovyan et al., A Cipher Based on Data-Dependent Permutations, Aug. 2001, Journal of Cryptology, pp. 61-72.*

Lin et al., A VLSI Implementation of the Blowfish Encryption/Decryption Algorithm, 2000, IEEE.*

Childers et al., Architectural Considerations for Application-Specific Counterflow Pipelines, Mar. 1999, IEEE, Advanced Research in VLSI.*

Sherigar et al., A pieplined parallel processor to implement MD4 message digest algorithm on Xilinx FPGA, Jan. 1998, IEEE, Eleventh International Conference on VLSI Design, pp. 394-399.*

Craig Clapp, Optimizing a Fast Stream Cipher for VLIW, SIMD, and Superscalar Processors, 1997, Proceedings of Fast Software Encryption Workshop.*

Ye et al., CHIMAERA: a high-performance architecture with a tightly-coupled reconfigurable functional unit, 2000, IEEE, Proceedings of the 27th International Symposium on Computer Architecture, pp. 225-235.*

Ian Goldberg and David Wagner. Architecture Considerations for Cryptanalytic Hardware. CS252 Report, May 1996. <http://citeseer.ist.psu.edu/goldberg96architectural.html>.*

Fluhrer, S., et al., "Attack on RC4 and WEP," Cryptobytes 2002, http://www.wisdom.weizmann.ac.il/~itsik/RC4/rc4.html, 9 pages.

Fluhrer, S., et al., "Statistical Analysis of the Alleged RC4 Keystream Generator," FSE 2000, http://www.wisdom.weizmann.ac.il/~itsik/RC4/rc4.html, 12 pages.

Fluhrer, S., et al., "Weakness in the Key Scheduling Algorithm of RC4," SAC 2001, http://www.wisdom.weizmann.ac.il/~itsik/RC4/rc4.html, 23 pages.

Golic, Jovan D., "Linear Statistical Weakness of Alleged RC4 Keystream Generator," EUROCRYPT 1997, http://www.wisdom.weizmann.ac.il/~itsik/RC4/rc4.html, pp. 226-238.

Grosul, A. L., et al., "A Related-Key Cryptanalysis of RC4," Jun. 6, 2002, http://www.wisdom.weizmann.ac.il/~itsik/RC4/rc4.html, pp. 1-13.

Knudsen, L.R., et al., "Analysis Methods for (Allegd) RC4," ASIACRYPT 1998, http://www.wisdom.weizmann.ac.il/~itsik/RC4/rc4.html, 15 pages.

Mantin and Shamir, "A Practical Attack on Broadcast RC4," FSE 2001, http://www.wisdom.weizmann.ac.il/~itsik/RC4/rc4.html, 13 pages.

Schneier, B., Applied Cryptography, Second Edition, published by John Wiley & Sons, Inc., 1996, ch. 17 "Other Stream Ciphers and Real Random-Sequence Generators," pp. 397-398.

Stubblefield, A., et al., "Using the Fluhrer, Mantin, and Shamir Attack to Break WEP," AT&T Labs Technical Report TD-4ZCPZZ, Aug. 6, 2001, http://www.wisdom.weizmann.ac.il/~itsik/RC4/rc4.html, 9 pages.

RSA Laboratories, Cryptography FAQ, What is RC4? http://www.rsasecuirty.com/rsalabs/faq/3-6-3.html, Jan. 30, 2002, 1 page.

* cited by examiner

PSEUDO-CODE 100

| OPERATION | CYCLE | i | j | a | b | t | l | temp | MEMORY READ (FIRST CYCLE) (MR1) | MEMORY READ (SECOND CYCLE) (MR2) | MEMORY WRITE (MW) |
|---|---|---|---|---|---|---|---|---|---|---|---|
| a = S[i+1] | 0 | | | | | | | | S[i] | | |
| i++ | 1 | i+1 | | | | | | | | S[i] | |
| j = j + a | 2 | | j + MR2 | MR2 | | | | | | | |
| b = S[j] | 3 | | | | | | | | | S[j] | |
| | 4 | | | | | | | | | | |
| S[j] = b, t = a + b, temp = plain[l] | 5 | | | | MR2 | MR2 + a | | | plain[l] | S[j] | S[j] = MR2 |
| S[j] = a | 6 | | | | | | | | S[t] | plain[l] | S[j] = a |
| 7 (0) | 7 (0) | | | | | | | MR2 | | S[t] | |
| temp = temp XOR S[t] | 8 (1) | | | | | | i+1 | temp XOR MR2 | | | |
| l++ | 9 (2) | | | | | | | | | | cipher[l] = temp |

FIG. 2 (PRIOR ART)

SPECULATIVE EXECUTION FOR DATA CIPHERING OPERATIONS

CROSS REFERENCE TO RELATED APPLICATION

This application claims the benefit of U.S. provisional patent application No. 60/361,247 entitled "Speculative Execution for Data Ciphering Operations," filed Mar. 1, 2002.

FIELD OF THE INVENTION

The invention relates to the field of computer processing. More specifically, the invention relates to speculative execution for data ciphering.

BACKGROUND OF THE INVENTION

Communication networks and the number of users of such networks continue to increase. On-line sales involving both business-to-business and business to consumer over the Internet continues to proliferate. Additionally, the number of people that are telecommuting continues to grow. Both on-line sales and telecommuting are examples of usage of communication networks that typically involve private and sensitive data that needs to be protected during its transmission across the different communication networks.

Accordingly, security protocols, (e.g., Transport Layer Security (TLS), Secure Sockets Layer (SSL) 3.0, Internet Protocol Security (IPSec), etc.), have been developed to establish secure sessions between remote systems. These security protocols provide a method for remote systems to establish a secure session through message exchange and calculations, thereby allowing sensitive data being transmitted across the different communication networks to have a measure of security and/or untamperability.

Moreover, different ciphers have been developed to allow for these secure communications using such different security protocols. RC4 is a stream cipher having variable size keys using byte-oriented operations. RC4 employs a Substitution (S)-box in its generation of byte values that are subsequently XORed with the plaintext to generate the ciphertext and/or XORed with ciphertext to generate the corresponding plaintext.

However, current approaches for RC4 are limited in their execution speed due to the bottlenecking that occurs while accessing the S-box. In particular, a processing unit executes the RC4 operations in conjunction with a memory that is used to store the S-box needed for the operations. Accordingly, the processing unit accesses the S-box for the different operations. To help illustrate, FIG. 1 includes pseudo-code for a prior art technique for RC4 used in the generation of ciphertext. As shown, FIG. 1 includes pseudo-code 100 that comprises a while loop based on while code statement 102, wherein code statement 104, code statement 106, code statement 108, code statement 110 and code statement 112 are executed within the while loop.

Additionally, FIG. 2 illustrates a waterfall diagram of the process cycles for an implementation of the pseudo-code shown in FIG. 1, according to the prior art. In particular, waterfall diagram 200 illustrates a partially unrolled implementation of the while loop of pseudo-code 100. Pseudo-code 100 is typically executed in a processor wherein the S-box used in conjunction with pseudo-code 100 is stored in a memory coupled to the processor. In FIG. 2, the memory is pipelined, has a single read port, a single write port, and takes three cycles to access. FIG. 2 includes waterfall diagram 200 that illustrates the change in the values of variables of pseudo-code 100 as well as the timing of the accesses to the memory. Waterfall diagram 200 includes column 202, which is a list of the operations of pseudo-code 100. Accordingly as shown, the rows of waterfall diagram 200 correspond to the operations shown in pseudo-code 100. Waterfall diagram 200 also includes column 204, which illustrates the process cycles for the execution of pseudo-code 100.

Columns 206-216 of waterfall diagram 200 illustrate the change in the variables of pseudo-code 100 (i, j, a, b, t and l). Column 218 illustrates a temporary variable (temp) that is used for the storage of temporary results within the processor. The variables i, j and t are used as indexes into the S-box. The variables a and b are used to temporarily store values retrieved from the S-box based on the index variables i and j, respectively. The variable l is used as an index into the data arrays for both the plaintext and the ciphertext generated there from.

Column 220 of waterfall diagram 200 illustrates the reading of the memory (that is coupled to the processor executing pseudo-code 100) for a first cycle, while column 222 illustrates the reading of the memory for a second cycle. Column 224 of waterfall diagram 200 illustrates the writing to the memory.

As will be shown in FIGS. 1 and 2, current approaches for an RC4 operation include the generation of a single byte of ciphertext for one iteration of the while loop (shown in pseudo-code 100). Accordingly, a given iteration of the while loop in FIG. 1 includes (1) a single set of memory accesses from the S-box, (2) a swap of the data retrieved from the memory accesses and (3) the XORing of the plaintext based on the swapped data for the generation of a single byte of ciphertext. Moreover, as will be shown by waterfall diagram 200, this approach includes a number of process cycles wherein there are no accesses made to memory, thereby causing the RC4 operation to be limited in execution speed due to bottlenecking that occurs while accessing the S-box.

Returning to FIG. 1, the LEN variable stores the length of the plaintext or data to be ciphered. The while code statement 102, therefore, executes until the number of bytes equaling the value stored in LEN have been ciphered.

At process cycle zero (shown at column 204 of waterfall diagram 200), the processor executes code statement 104, wherein the value stored in the S-box (S[ ]) at an offset of i+1 is assigned to the variable of a, as part of the memory accessing (as shown in column 220).

At process cycle one, the processor executes a portion of code statement 106, wherein the variable i is incremented (as shown in column 206). Additionally, within process cycle one (as shown in column 222), the second read cycle associated with the read operation of S[i] is also occurring, as two process cycles are needed to retrieve the data from memory.

At process cycle two, the processor executes the other portion of code statement 106, as the value of j+a is assigned to j. In particular, since the read operation of S[i] takes two cycles to complete (after two process cycles), the result of such operation cannot be employed until three cycles later (process cycle two), wherein j equals the value of a added to the current value of j. Accordingly, the result of the memory operation is added to the current value of j to generate a new value of j (as shown in columns 208 and 210).

At process cycle three, the processor executes code statement 108 wherein the value stored in the S-box (S[ ]) at an offset of j is assign to the variable b, for a second memory access (as shown in column 220). In particular, the access of the S-box is available three cycles after a prior access to the S-box (process cycle zero).

At process cycle four, none of the code statements in pseudo-code 100 is executed. Rather, in process cycle four, the second cycle associated with the read operation of S[j] is executed (as shown in column 222).

At process cycle five, (as part of the swapping of the data in the S-box) the processor executes a portion of code statement 110, wherein the value of b is assigned to the location within the S-box having an offset of i (as shown in column 224). Accordingly, as shown in FIG. 2, a write to memory occurs wherein the location within the S-box having an offset of i is set to the current value read from memory (as b has been set to this current value in process cycle four). Additionally, at process cycle five, the variable t is assigned to the addition of the values of a (S[i]) and b (S[j]). As shown in FIG. 2, t is therefore set to the value of S[i] plus the current value read from memory (S[j]). Also at process cycle five, the processor executes a portion of code statement 112, wherein the value at the location within the array of data to be ciphered (plain[ ]) at an offset of l is read from the memory (as shown in column 220).

At process cycle six, (as part of the swapping of the data in the S-box) the processor executes another portion of code statement 110, wherein the location within the S-box having an offset of j is set to the value of a (as shown in column 224). Also within process cycle six, the processor retrieves the value at the location within the S-box having an offset of t (as shown in column 220). Additionally within process cycle six, the second read cycle for the retrieval of the value at the location within the array of data to be ciphered (plain[ ]) at an offset of l is read from the memory (as shown in column 222).

Additionally, an overlap in the generation of two different portions of ciphertext is occurring, as the second iteration of the while loop of FIG. 1 (denoted by parenthesized value in column 204) commences during process cycle seven of the first iteration of that while loop. At process cycle seven (process cycle zero of the subsequent iteration of the while loop of FIG. 1), the temp variable is set to the value at the location within the array of data to be ciphered (plain[ ]) at an offset of l (as shown in column 218), wherein the temp value is set to the value read from memory (MR2)). Also at process cycle seven (process cycle zero of the subsequent iteration of the while loop of FIG. 1) is where the retrieval of the value at the location within the S-box having an offset of t is completed (shown in column 222). Additionally, the operation (a=S[i]) (code statement 104) of the next iteration of the loop in FIG. 1 is performed.

At process cycle eight (process cycle one of the subsequent iteration of the while loop of FIG. 1), the processor generates the byte of ciphertext. In particular, the temp variable is set to the current temp value (plain[l]) XORed with the value at the location within the S-box having an offset of t (S[t]) (as shown in column 218 where temp is XORed with the value read from memory (MR2) (which is S[t])). Also during process cycle eight (process cycle one of the subsequent iteration of the while loop of FIG. 1), the operation (i++) (code statement 106) of the next iteration of the loop of FIG. 1 is performed.

At process cycle nine (process cycle two of the subsequent iteration of the while loop of FIG. 1), the remaining portion of code statement 112 is executed, wherein the l variable is incremented (as shown in column 216). Moreover, at process cycle nine (process cycle two of the subsequent iteration of the while loop of FIG. 1), the byte of ciphertext that was generated is stored in a data array (cipher[ ]). In particular, the value of temp is stored into the array of data that is ciphered at an offset of l (as shown in column 224). Finally, during process cycle nine (process cycle two of the subsequent iteration of the while loop of FIG. 1), the operation (j=j+a) (the remainder of code statement 106 associated with the next iteration of the loop of FIG. 1) is performed. Thus, certain non-speculative operations that contribute to the generation of the next portion of cipher text are overlapped with the operations to generate the previous portion of cipher text.

The loop of FIG. 1 can be implemented in FIG. 2 in of a number of different ways. For example, the loop can be implemented in FIG. 2 to cause the repetition of process cycles 3, 4, 5, 6, 7(0), 8(1) and 9(2) until the plaintext has been ciphered into ciphertext. As another example, the remaining process cycles of the next ciphertext could be continued to process cycle 6 of that ciphertext and the loop could cause the repetition of 7(0), 8(1), 9(2), 3, 4, 5 and 6.

In a similar manner to the generation of ciphertext through encryption of plaintext, RC4 can also be used to generate plaintext through the decryption of ciphertext. Thus, RC4, whether encrypting or decrypting, translates input text blocks into output text blocks.

Disadvantageously, as illustrated, the bottleneck of this prior art approach to an RC4 operation is associated with the access of data from the S-box stored in memory. The overlapping of the generation of the two different portions of ciphertext are non-speculative in nature. Specifically, in order to avoid the generation of inaccurate data for the ciphertext, the write operation to the S-box for the generation of a first portion of ciphertext is complete prior to the load operation to the S-box for the generation of a second portion of the ciphertext. As shown, three cycles are needed for each read operation in order to ensure that the data retrieved from the S-box is up-to-date. Accordingly, one byte of the plaintext is encrypted into ciphertext per seven process cycles.

SUMMARY OF THE INVENTION

A method, apparatus and system for speculative execution for data ciphering are described. In one embodiment, a computer-implemented method comprises receiving a data cipher operation. The method also comprises processing the data cipher operation. The processing of the operation includes generating a number of portions of ciphertext from plaintext, wherein a load operation associated with the generating of at least one portion of the ciphertext executes prior to a store operation associated with the generating of a prior portion of the ciphertext.

In an embodiment, a computer-implemented method executes in a processor. The method comprises receiving a request to perform data ciphering of plaintext. The method also comprises processing the request based on a data structure stored in a memory coupled to the processor. The processing includes performing a first access of data from the data structure and swapping the data from the first access. The process also includes data ciphering a first portion of the plaintext based on the swapped data from the first access. Additionally, the processing comprises performing a second access of data from the data structure prior to the swapping of the data from the first access. The processing also includes performing the following, upon determining that the data from the first access does not equal the data from the second access: swapping the data from the second access and data ciphering a second portion of the plaintext based on the swapped data from the second access.

In an embodiment, an apparatus comprises a memory to store a data structure. The apparatus also comprises a processing unit coupled to the memory. The processing unit is to execute a data ciphering operation. Additionally, the processing unit is to swap data stored in the data structure for data ciphering of a first portion of plaintext. Moreover, prior to the completion of the swapping of the data stored in the data structure for data ciphering of the first portion of the plaintext, the processing unit is to access data stored in the data structure for data ciphering of a second portion of the plaintext.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, host execution unit 300 can be located in FIG. 3. However, element numbers are the same for those elements that are the same across different Figures.

In the drawings:

FIG. 2 illustrates a waterfall diagram of the process cycles for the pseudo-code shown in FIG. 1, according to the prior art.

DETAILED DESCRIPTION

A method, apparatus and system for speculative execution for data ciphering are described. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Overview

Embodiments of the invention provide for faster execution of data ciphering in comparison to current approaches.

As will be described in more detail below, in various embodiments of the invention, a data ciphering scheme is implemented by overlapping operations to generate different output blocks of data through use of speculative execution of memory accesses. In one such embodiment, data ciphering based on RC4 is employed such that the memory storing the S-box (which stores data needed for the RC4 operations) is more fully utilized. RC4 is a data ciphering scheme in which output blocks are weakly coupled, such that there is a relatively low probability that collisions will occur between data used to generate such different output blocks. While embodiments are described in which RC4 is employed, alternative embodiments may employ different data ciphering schemes in which neighboring output blocks are weakly coupled (where the output blocks are generated in an order and the generation of those output blocks that are in close proximity to each other according to that order are weakly coupled). However, embodiments of the invention are not limited to such data ciphering schemes, as embodiments can be incorporated into any of a number of different types of data ciphering schemes (such as Advanced Encryption Standard (AES), RC5, Data Encryption Standard (DES) etc.).

Further, in one embodiment, the RC4 operations are based on modulo 256, wherein there are two inputs (eight bits in length) and one output (eight bits in length). However, embodiments of the invention are not so limited, as other variations of the RC4 operations can be incorporated into embodiments of the invention.

Additionally, while embodiments of the invention are described with reference to the generation of ciphertext through encryption of plaintext, embodiments of the invention are not so limited. Rather, embodiments of the invention are also applicable to the generation of plaintext through decryption of ciphertext. Thus RC4 for example, whether encrypting or decrypting, translates input text blocks into output text blocks.

Figure 1:
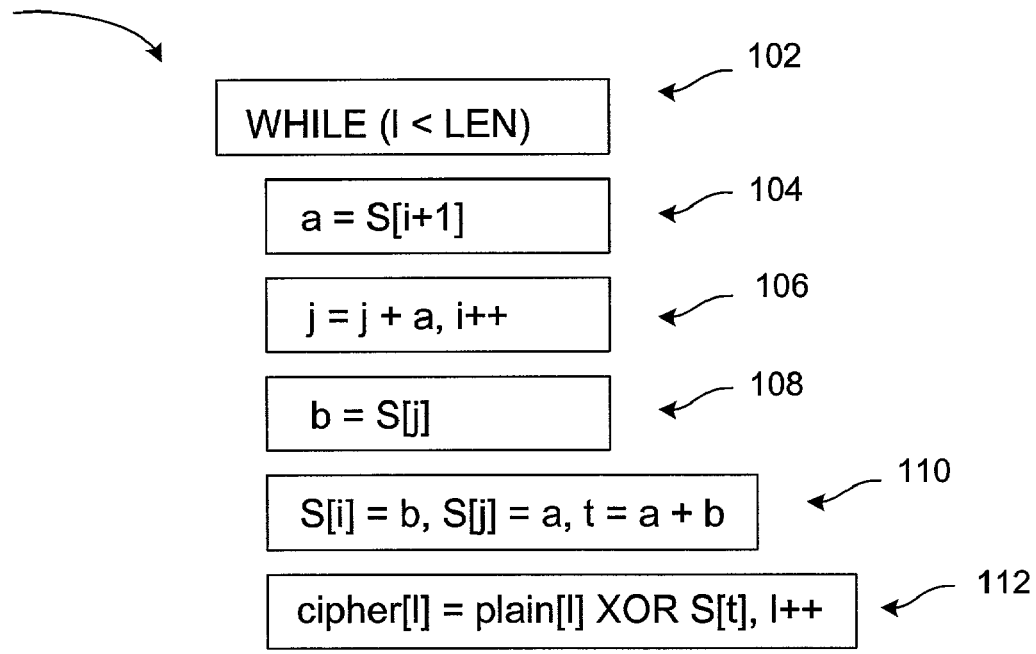
FIG. 1 includes pseudo-code for a prior art technique for RC4 used in the generation of ciphertext.
Figure 3:
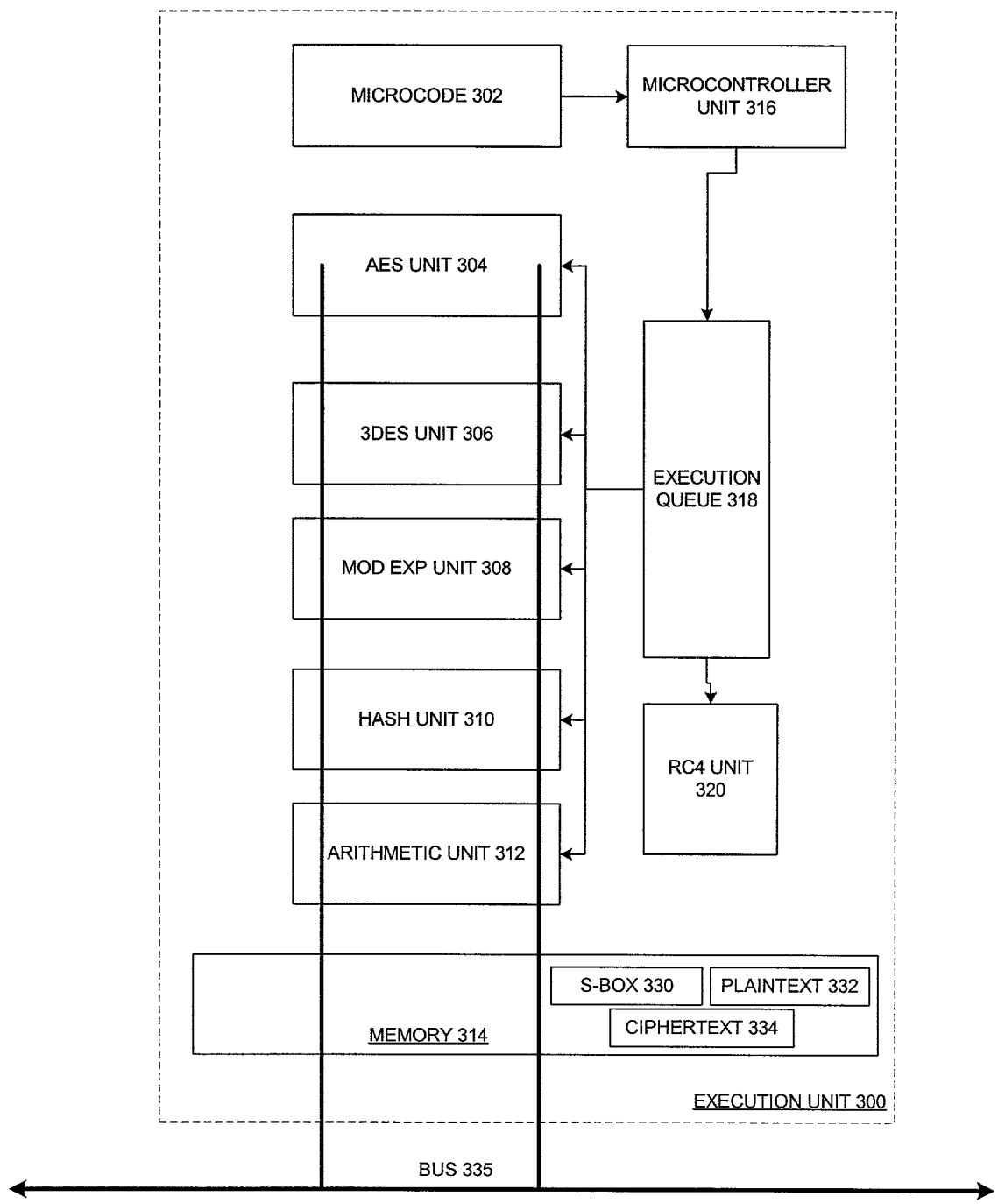
FIG. 3 is a block diagram illustrating a system for data ciphering, according to one embodiment of the invention.
Figure 4:
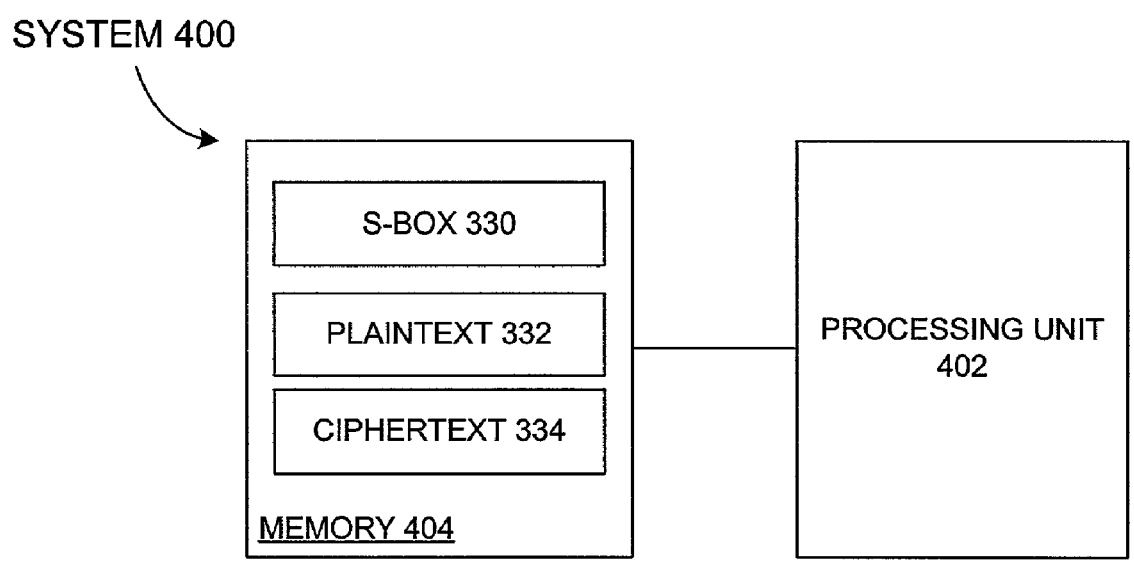
FIG. 4 is a block diagram illustrating an alternative system for data encryption, according to one embodiment of the invention.
Figure 5:
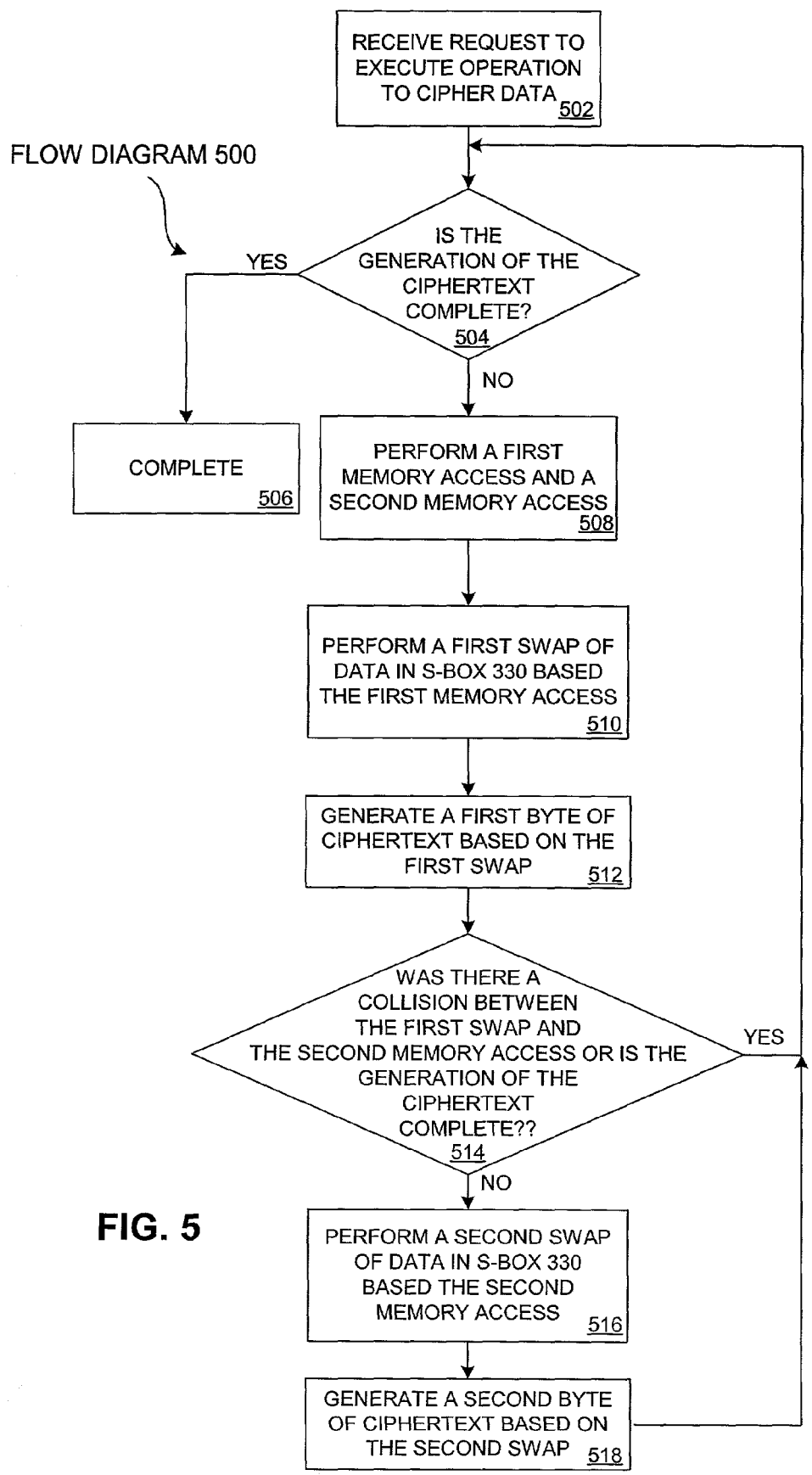
FIG. 5 is a flow diagram illustrating exemplary operations for data ciphering according to one embodiment of the invention.

FIGS. 3 and 4 show block diagrams of exemplary systems for data ciphering, in accordance with embodiments of the invention. FIG. 5 shows a flow diagram illustrating operations for data ciphering, according to embodiments of the invention. The operations of the flow diagram will be described with references to the exemplary systems shown in the block diagrams. However, it should be understood that the operations of the flow diagram could be performed by embodiments of systems other than those discussed with reference to the block diagrams, and embodiments discussed with reference to the systems could perform operations different than those discussed with reference to the flow diagram.

Apparatus Description

FIG. 3 is a block diagram illustrating a system for data ciphering, according to one embodiment of the invention. In FIG. 3, execution unit 300 comprises microcode block 302, which is coupled to microcontroller unit 316. The microcontroller unit 316 is coupled to execution queue 318. Execution queue 318 is coupled to a set of primitive security operation blocks. The primitive security operation blocks include Advanced Encryption Standard (AES) unit 304, Triple Data Encryption Standard (3DES) unit 306, modular exponentiation unit 308, hash unit 310, arithmetic unit 312 and alleged RC4® (RC4) unit 320.

Alternative embodiments of the invention may include additional primitive security operation units or fewer primitive security operation units. Memory 314 is coupled to the primitive security operation units 304, 306, 308, 310 and 312 through bus 335. In one embodiment, bus 335 is also coupled to external memory and/or other execution units. For example, one such configuration is described in further detail in co-pending patent application, entitled "An Interface to a Security Co-Processor" Ser. No. 10/025,512 to Richard E. Kessler, David A. Carlson, Muhammad Raghib Hussain, Robert A. Sanzone and Khaja E. Ahmed, which is hereby incorporated by reference.

In one embodiment, microcode block 302 is used by microcontroller unit 316 to translate a security operation into one or more primitive security operations. Microcontroller unit 316 retrieves from memory 314 the appropriate data for each of the primitive security operations. The primitive security operations are placed into execution queue 318 by microcontroller unit 316. When a primitive security operation's corresponding primitive security operation block is able to perform the primitive security operation, execution queue 318 pushes the primitive security operation to the appropriate primitive security operation unit 304, 306, 308, 310, 312 and/or 320. Once a primitive security operation unit 304, 306, 308, 310 and 312 has executed the primitive security operation, the primitive security operation unit either passes the results to memory 314 or onto bus 335.

In an embodiment, the primitive security operations placed into execution queue 318 also indicate where the results of an operation will be stored. In one embodiment, the results of an operation by a given primitive security operation unit can be (1) stored in memory 314, a memory external to execution unit 300 (not shown) and/or (2) served as inputs to another primitive security operation unit. For example, a first primitive security operation unit can generate a result, wherein a second primitive security operation unit reads that result from the first primitive security operation unit for processing within the second primitive security operation unit.

Memory 314 can be any of a number or a combination of different types of memories (e.g., static random access memory (SRAM), dynamic random access memory (DRAM), etc.). Additionally, in an embodiment, memory 314 is to store S-box 330, plaintext 332 and ciphertext 334. Although S-box 330, plaintext 332 and ciphertext 334 can be any of a number of different data structures, in an embodiment, S-box 330, plaintext 332 and ciphertext 334 are data arrays. For example, in other embodiments, S-box 330, plaintext 332 and ciphertext 334 could be different types of tables or classes of objects (such as those used in object-oriented databases). In one embodiment, S-box 330 is a 256-byte array.

As will be described in more detail below, RC4 unit 320 executes a number of operations for data ciphering wherein data stored in plaintext 332 is converted to data stored in ciphertext 334 (or vice versa) based on accesses (both read and write) to S-box 330. In one embodiment, RC4 unit 320 is a hardware state machine for the generation of ciphertext and/or plaintext based on RC4 operations.

While one embodiment is described in which each execution unit has its own microcode block, alternative embodiments have one or more execution units share a single microcode block. Yet other embodiments have a central microcode block (e.g., in SRAM) whose contents are loaded upon power-up into local microcode blocks in each of the execution units. Regardless of the arrangement of the microcode block(s), in certain embodiments the microcode blocks are reprogrammable to allow for flexibility in the selection of the security operations (be they macro and/or primitive security operations) to be performed.

Moreover, embodiments of the invention are not limited to the system illustrated in FIG. 3. In particular, embodiments of the invention can be within other configurations that include a processing unit for data ciphering and a memory coupled thereto and/or internal therein. For example, FIG. 4 is a block diagram illustrating an alternative system for data ciphering, according to one embodiment of the invention. As shown, FIG. 4 illustrates system 400 that comprises processing unit 402 and memory 404, which are coupled together. In one embodiment of the invention, memory 404 is to store S-box 330, plaintext 332 and ciphertext 334. As will be described in more detail below, processing unit 402 executes a number of operations for data ciphering wherein data stored in plaintext 332 is converted to data stored in ciphertext 334 (or vice versa) based on accesses (both read and write) to S-box 330.

Data Ciphering Operations

The data ciphering operations will now be described in terms of a flow diagram illustrated in FIG. 5, corresponding pseudo-code illustrated in FIG. 6 and an implementation illustrated in FIG. 7. Accordingly, FIGS. 5, 6 and 7 will be described in conjunction to help illustrate data ciphering operations, according to one embodiment of the invention. The description of the data ciphering operations will follow the flow of the flow diagram of FIG. 5. Additionally, the process blocks of the flow diagram of FIG. 5 will be described in terms of the corresponding pseudo-code of FIG. 6 and the process cycles of FIG. 7. For example, process block 512 is associated with code statements 620 and 622 of the pseudo-code in FIG. 6 and is associated with process cycles four through nine of FIG. 7.

Figure 6:
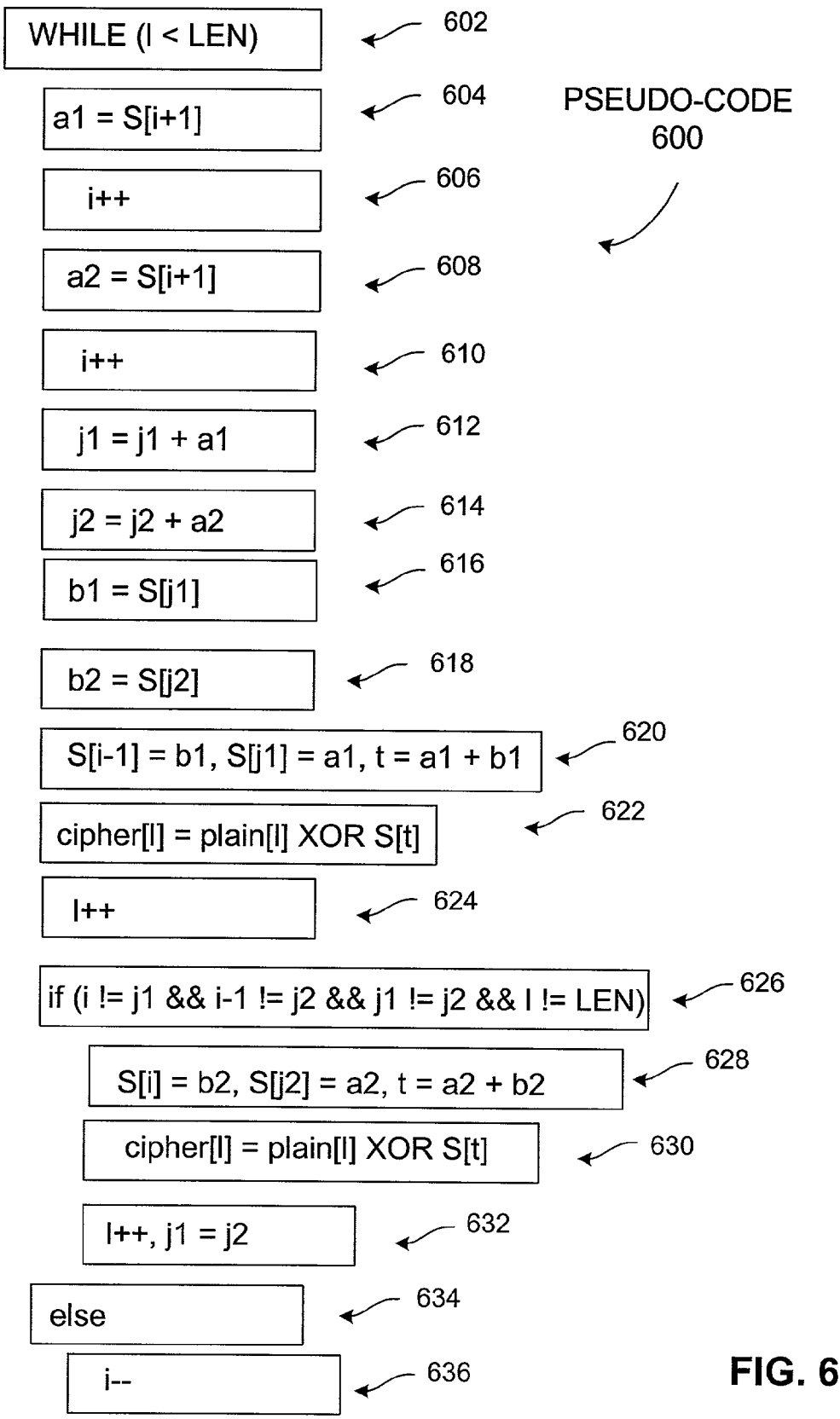
FIG. 6 includes pseudo-code used in the generation of ciphertext based on RC4, according to one embodiment of the invention.

As described in more detail below, FIGS. 5 and 6 illustrate the generation of a speculative and non-speculative ciphertext block per iteration of the loop in FIGS. 5 and 6. In contrast, per iteration of the loop of FIG. 7, the implementation of FIG. 7: (1) completes the generation of a speculative and non-speculative ciphertext block; and (2) begins the generation of another speculative and non-speculative ciphertext block.

FIG. 5 is a flow diagram illustrating exemplary operations for data ciphering according to one embodiment of the invention. The operation of flow diagram 500 of FIG. 5 will be described with reference to the exemplary system of FIG. 3.

As shown in block 502, a request to execute operation to cipher data is received. With reference to the exemplary embodiment in FIG. 3, RC4 unit 320 receives this request from execution queue 318 to perform an RC4 operation to cipher data. In an embodiment, the data is plaintext data that is stored in plaintext 332 within memory 314, while the ciphertext that is generated is stored in ciphertext 334 within memory 314. In an embodiment, RC4 unit 320 employs S-box 330 within memory 314 in the generation of the ciphertext. The processing of the operation to cipher data will be described with reference to the remaining process blocks within flow diagram 500.

In process decision block 504, a decision is made whether the generation of the ciphertext is complete. With reference to the exemplary embodiment in FIG. 3, RC4 unit 320 determines whether the generation of the ciphertext is complete. To help illustrate, FIG. 6 includes pseudo-code used in the generation of ciphertext based on RC4, according to one embodiment of the invention. As shown, FIG. 6 includes pseudo-code 600 that comprises a while loop based on while code statement 602, wherein code statements 604, 606, 608, 610, 612, 614, 616, 618, 620, 622, 624, 626, 628, 630, 632, 634 and 636 are executed within the while loop. Therefore in an embodiment, within while statement 602, the LEN variable stores the length of the data stored in plaintext 332. In one embodiment, the while code statement 602, therefore, executes until the number of bytes equaling the value stored in LEN have been ciphered.

In process block 506, upon determining that the generation of the ciphertext is complete, the process is complete. In terms of pseudo-code 600 at while statement 602, once the value of l is not less than LEN, the process is complete. With reference to the exemplary embodiment in FIG. 3, in an embodiment, RC4 unit 320 returns a value and/or generates a signal that is transmitted back to microcontroller unit 316 indicating that the RC4 operation is complete.

In process block 508, upon determining that the generation of the ciphertext is not complete, a first memory access and a second memory access (for this iteration of the while loop in FIG. 6) is performed. In other words, a load operation associated with the generation of a first portion of ciphertext (for a given iteration) is performed. Additionally, a load operation associated with the generation of a second portion of ciphertext (for the same iteration) is performed. With reference to the exemplary embodiment in FIG. 3, RC4 unit 320 performs a first memory access and a second memory access to memory 314, wherein data from S-box 330 is retrieved during such accesses. In terms of pseudo-code 600, the first and second memory accesses are within code statements 604, 606, 608, 610, 614, 616 and 618. Within code statement 604, RC4 unit 320 retrieves the value stored in S-box 330 at an offset of i+1 (S[i+1]) and assigns the value to the variable a.

Figure 7:
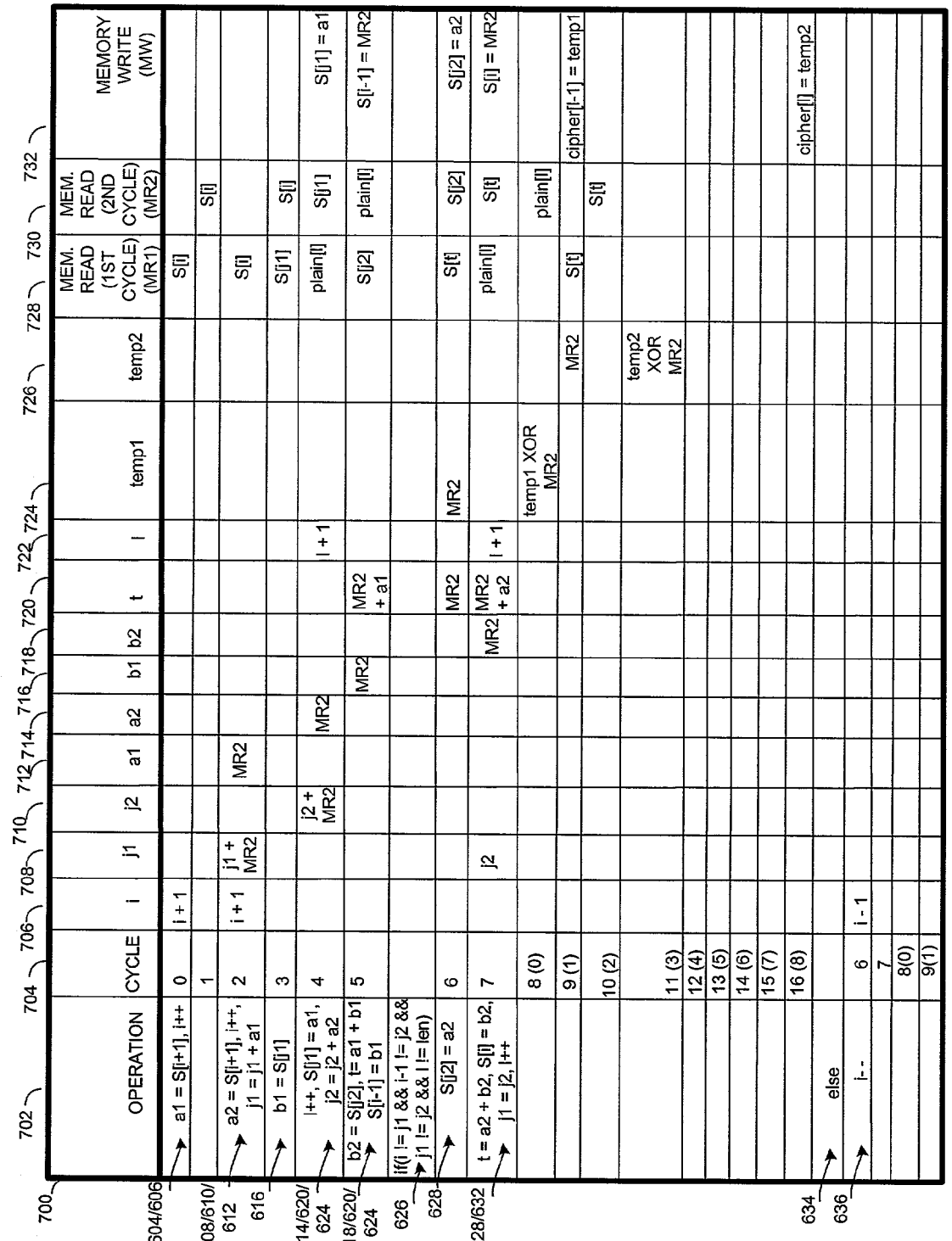
FIG. 7 shows a waterfall diagram of an implementation of the pseudo-code shown in FIG. 6, according to an embodiment of the invention.

To better illustrate, FIG. 7 shows a waterfall diagram of an implementation of the pseudo-code shown in FIG. 6, according to an embodiment of the invention. In one embodiment, the waterfall diagram 700 is implemented by a hardware state machine within RC4 unit 320. The waterfall diagram 700 illustrates the changes in the values of variables of pseudo-code 600 as well as the timing of the accesses to data (e.g., S-box 330) in memory 314.

Waterfall diagram 700 includes column 702, which is a list of the operations of pseudo-code 600. Accordingly, as shown, the rows of waterfall diagram 700 correspond to the operations shown in pseudo-code 600. Waterfall diagram 700 also includes column 704, which includes the process cycles that correspond to the execution of pseudo-code 600.

Columns 706-722 of waterfall diagram 700 illustrate the change in the variables of pseudo-code 600, i, j1, j2, a1, a2, b1, b2, t and l, over the execution of the process cycles. The numbers 1 and 2 following such variables designate whether the variable is being used to generate respectively the non-speculative or speculative ciphertext portion for a given iteration of the loop of FIG. 6. Additionally, columns 724 and 726 illustrate the change in temporary variables (temp1 and temp2) (for the storage of temporary results within RC4 unit 320) over the execution of the process cycles.

The variables i, j1, j2 and t are used as indexes into S-box 330. The variables a1, a2, b1 and b2 are used to temporarily store values retrieved from S-box 330 for the index variables i, j1 and j2. The variable l is used as an index into the data structures for both the plaintext and the ciphertext generated there from (plaintext 332 and ciphertext 334, respectively). Additionally, the variables j1, a1 and b1 are used in conjunction with a first memory access and a first swap of elements within S-box 330 for a cipher of a first byte for a given iteration (as will be described in more detail below). The variables j2, a2 and b2 are used in conjunction with the second memory access and second (speculative) swap of elements within S-box 330 for a cipher of a second byte for a given iteration (as will be described in more detail below).

Column 728 illustrates the reading of memory 314 for a first cycle, while column 730 illustrates the reading of memory 314 for a second cycle. Column 732 illustrates the writing of data to memory 314. Additionally, waterfall diagram 700 illustrates process cycles six-nine of an iteration of the while loop in FIG. 6 under two different scenarios. In particular, the first scenario of process cycles six-nine illustrate when the if statement in code statement 626 is true such that code statements 628-632 are executed. The second scenario of process cycles six-nine illustrate when the if statement in code statement 626 is false such that code statements 634 and 636 are executed.

With regard to process block 508, in terms of the process cycles illustrated in waterfall diagram 700, the first and second memory accesses are within process cycles zero, one, two, three, four and five. At process cycle zero, as shown in column 728 of FIG. 7, the S-box at offset i, S[i], is accessed in a first memory read cycle from memory 314. Additionally, at process cycle zero, RC4 unit 320 executes code statement 606, wherein the value of i is incremented for the second memory access (as shown in column 706).

At process cycle one, in one embodiment, RC4 unit 320 does not execute one of the code statements of pseudo-code 600. However, within process cycle one (as shown in column 730), the second read cycle associated with the read operation of S[i] is occurring, as, in one embodiment, two process cycles are needed to retrieve the data from memory 314.

At process cycle two, RC4 unit 320 executes code statement 608, code statement 610 and code statement 612. In particular, for the second memory access, RC4 unit 320 executes code statement 608, which causes the value stored in S-box 330 (S[ ]) at an offset of i+1 to be assigned to the variable a2 (as shown in column 728). Additionally, at process cycle two, RC4 unit 320 executes code statement 610, wherein the value of i is incremented (as shown in column 706). Also, at process cycle two (related to the first memory access), RC4 unit 320 executes code statement 612, wherein the variable s is assigned to the value of j1 added to the value of a1. In other words, the value stored in j1 is increased by the value stored in S[i] (as shown in column 708).

At process cycle three, RC4 unit 320 executes code statement 616, wherein the value stored in S-box 330 at an offset of j1 is stored in variable b1 (as shown in column 728). Moreover, within process cycle three (as shown in column 730), the second read cycle associated with the read operation of S[i] is also occurring.

At process cycle four, RC4 unit 320 executes code statement 614 (relating to the second memory access), wherein the value of j2 is increased by the value of a2 (as shown in column 710). Also, at process cycle four, RC4 unit 320 executes code statement 624, wherein the value of l is incremented (as shown in column 722), thereby incrementing the index into plaintext 332 and ciphertext 334. Additionally, within process cycle four (as shown in column 730), the second read cycle associated with the read operation of S[j1] is also occurring. At process cycle five, RC4 unit 320 executes code statement 618 (related to the second memory access), wherein the variable b2 is assigned to the value stored in S-box 330 at an offset of j2 (S[j2]) (as shown in column 728).

Returning to flow diagram 500 of FIG. 5, in process block 510, a first swap of data in S-box 330 is performed based on the first memory access. In other words, a store operation associated with the generation of a first portion of ciphertext (for a given iteration of the loop in FIG. 5) is performed.

With reference to the exemplary embodiment in FIG. 3, RC4 unit 320 performs the first swap of data in S-box 330 stored in memory 314. In one embodiment, in terms of the code statements in pseudo-code 600 and the process cycles in waterfall diagram 700, this first swapping of data in S-box 330 is within code statement 620 and process cycles four and five, respectively.

Figure 8:
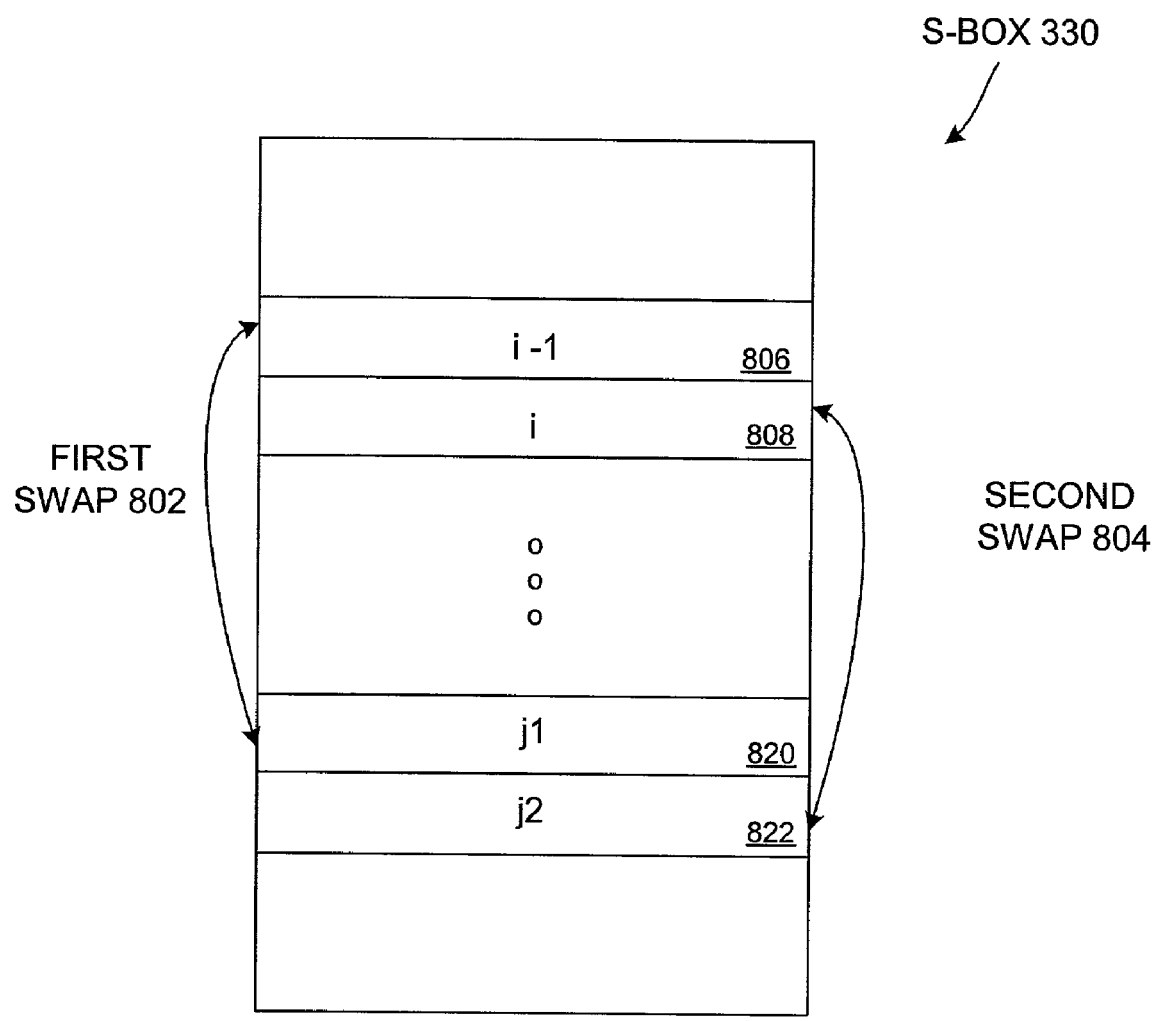
FIG. 8 shows the swapping of values within an S-box for data ciphering, according to one embodiment of the invention.

With reference to waterfall diagram 700, at process cycle four, RC4 unit 320 executes code statement 620, wherein the value of a1 (which is the value within S[i−1], in reference to the current value of i) is stored in S-box 330 at an offset of j1 (as shown in column 732). To help illustrate, FIG. 8 shows the swapping of values within an S-box for data ciphering, according to one embodiment of the invention. FIG. 8 illustrates S-box 330, which includes element 806, element 808, element 820 and element 822. Element 806 is an element to which i−1 is pointing, and element 808 is an element to which i is pointing. Element 820 is an element to which j1 is pointing, and element 822 is an element to which j2 is pointing. First swap 802 is a swap of the values stored in elements 806 and 820. Second swap 804 is a swap of the values stored in elements 808 and 822, which is described in more detail below. Accordingly, as part of first swap 802 (as described above), the value stored in element 806 (pointed to by i−1) is stored in element 820 (pointed to by j1), using the variable a1.

At process cycle five, RC4 unit 320 continues executing code statement 620, wherein the value of b1 (which is the value in S[j1]) is stored in S-box 330 at an offset of i−1 (as shown in column 732). With reference to FIG. 8, as part of first swap 802, the value stored in element 820 (pointed to by j1) is stored in element 806 (pointed to by i−1), using the variable b1.

Returning to flow diagram 500 of FIG. 5, in process block 512, a first byte of ciphertext (the non-speculative ciphertext block for this iteration) is generated based on the first swap. With reference to the exemplary embodiment in FIG. 3, RC4 unit 320 generates the first byte of ciphertext. In terms of the code statements in pseudo-code 600, the first byte of ciphertext (the non-speculative ciphertext block for this iteration) is generated within code statements 620 and 622. In terms of the waterfall diagram 700, the first byte of ciphertext (the non-speculative ciphertext block for this iteration) is generated within process cycles four through nine.

For the generation of the ciphertext, at process cycle four, RC4 unit 320 retrieves the value stored in plaintext 332 (plain[ ]) at an offset of l (as shown in column 728) (in conjunction with the execution of code statement 622). Additionally, within process cycle five, (as shown in column 730), the second read cycle associated with the read operation of plain[l] is occurring.

Moreover, the value within S-box 330 that will be used in the generation of the first byte of the ciphertext is retrieved. Accordingly, at process cycle five, an index (t) into S-box 330 for this value is generated based on the values stored at S[i−1] (stored in a1) and S[j1] (stored in b1) (as shown in column 720).

The value within S-box 330 at the index location (t) is retrieved. In particular, at process cycle six, RC4 unit 320 retrieves the value stored in S-box 330 at an offset of t (as shown in column 728). Additionally, within process cycle six, the value retrieved from plaintext 332 is stored in a temporary variable, temp1 (as shown in column 724).

Within process cycle seven, the second read cycle associated with the read operation of S[t] is occurring (as shown in column 730). Within process cycle eight, with the needed values returned from memory 314 (for the generation of the ciphertext), RC4 unit 320 sets the value of temp1 to the result of XORing the plaintext element, plain[l] (stored in temp1) with the value from S-box 330, S[t] (as shown in column 724). In an embodiment, the resultant value of this XOR is the first byte of ciphertext for the iteration of the loop in FIG. 6. Accordingly, at process cycle nine, this resultant value is stored in ciphertext 334, cipher[ ], at an offset of l−1 (as shown in column 732).

In process decision block 514, a decision is made on (1) whether there was a collision between the first swap and the second memory access or (2) whether the generation of the ciphertext is complete. With reference to the exemplary embodiment in FIG. 3, RC4 unit 320 makes this determination regarding the collision based on whether the elements in S-box 330 for the first swap correspond to the elements for the second memory access. Additionally, RC4 unit 320 determines whether the generation of the ciphertext is complete by determining if l is equal to LEN. In other words, RC4 unit 320 is checking the boundary condition when the last plaintext has been processed into ciphertext and therefore no additional processing is needed. In an embodiment, in terms of the code statements in pseudo-code 600 and the process cycles in waterfall diagram 700, these determinations is within code statement 626 and process cycle five, respectively.

In one embodiment, if the index values into S-box 330 for the first swap, i−1 or j1, equals the index values into S-box 330 for the second memory access, i or j2, then a collision has occurred. Therefore, the current values for the second memory access were not retrieved. Accordingly, the values retrieved for the second memory access cannot be used in a second swap to generate a second byte of ciphertext (for this iteration of FIG. 6). In particular, the values for the second swap were retrieved (as part of the second memory access) prior to the completion of the first swap. To help illustrate, the variable a2 was being set to S[i] at process cycle two before the first swap, which is occurring at process cycles four and five.

With regard to checking for collisions, in reference to pseudo-code 600, code statement 620 checks to see whether (1) i equals j1, (2) i−1 equals to j2 or (3) j1 equals j2. The condition of whether i−1 equals to i is not checked as this condition cannot occur. Moreover, in one embodiment, a collision is forced when the last element in the plaintext is being converted to ciphertext (as shown by the condition that check to see if the variable l is not equal to LEN (the length of the plaintext)).

Upon determining that a collision between the first swap and the second memory access did occur, the second swap and the generation of the second byte of ciphertext for this iteration are aborted and the process returns to process decision block 504, where a decision is made on whether the generation of the ciphertext is complete (as described above). With reference to the exemplary embodiment in FIG. 3, RC4 unit 320 aborts the generation of the second swap and the generation of the second byte of ciphertext for this iteration. In one embodiment, in terms of the code statements in pseudo-code 600 and the process cycles in waterfall diagram 700, this aborting of the generation of the second swap and the generation of the second byte of ciphertext for this iteration is within code statements 634 and 636 and process cycles five and six, respectively.

RC4 unit 320 executes code statement 634, which is an else statement that corresponds to the if statement in code statement 626. RC4 unit 320 executes code statement 636, which is part of the else clause under code statement 634. In process cycle six, the execution of code statement 634 causes the decrementing of the value stored in i (as shown in column 706). Accordingly, the second memory access of this current iteration is re-executed as the first memory access of the subsequent iteration.

Conversely, in process block 516, upon determining that a collision between the first swap and the second memory access did not occur, a second swap of data in S-box 330 is performed based on the second memory access. In other words, a store operation associated with the generation of a second portion of ciphertext (the speculative ciphertext block for a given iteration) is performed, upon determining that a store operation associated with the generation of a first portion of ciphertext (the non-speculative block for a given iteration) did not collide with a load operation associated with the generation of a second portion of ciphertext (for the same iteration). In an embodiment, in terms of the code statements in pseudo-code 600 and the process cycles in waterfall diagram 700, the second swap of data in S-box 330 is within code statement 628 and process cycles six and seven, respectively.

With reference to the exemplary embodiment in FIG. 3, RC4 unit 320 performs the second swap of data in S-box 330 based on the second memory access. At process cycle six, RC4 unit 320 executes a portion of code statement 628, wherein the value of a2 (which is the value stored in S[i]) is stored in S-box 330 at an offset of j2 (as shown in column 732). With reference to FIG. 8, as part of second swap 804, the value stored in element 808 (pointed to by i) is stored in element 822 (pointed to by j2), using variable a2. At process cycle seven, RC4 unit 320 continues executing code statement 628, wherein the value of b2 (which is the value stored in S[j2]) is stored in S-box 330 at an offset of i (as shown in column 732). With reference to FIG. 8, as part of second swap 804, the value stored in element 822 (pointed to by j2) is stored in element 808 (pointed to by i), using variable b2.

In process block 518, a second byte of ciphertext (in this iteration) is generated based on the second swap. In an embodiment, in terms of the code statements in pseudo-code 600 and the process cycles in waterfall diagram 700, the generation of the second byte of ciphertext (in this iteration) occurs within code statement 630 and process cycles seven, eight, nine, ten, eleven and sixteen, respectively.

At process cycle seven, RC4 unit 320 retrieves the value stored in plaintext 332 (plain[ ]) at an offset of l (as shown in column 728) (in conjunction with code statement 630). Additionally, within process cycle eight (as shown in column 730), the second read cycle associated with the read operation of plain[l] is occurring.

Moreover, the value within S-box 330 that will be used in the generation of the second byte of the ciphertext is retrieved. Accordingly, at process cycle eight, an index (t) into S-box 330 for this value is generated based on the values stored at S[i] (stored in a2) and S[j2] (stored in b2) (as shown in column 720).

The value within S-box 330 at the index location (t) is retrieved. In particular, at process cycle nine, RC4 unit 320 retrieves the value stored in S-box 330 at an offset of t (as shown in column 728). Additionally, within process cycle nine, the value retrieved from plaintext 332 is stored in a temporary variable, temp2 (as shown in column 726).

Within process cycle ten, the second read cycle associated with the read operation of S[t] is occurring (as shown in column 730). Within process cycle eleven, with the needed values returned from memory 314 (for the generation of the ciphertext), RC4 unit 320 sets the value of temp2 to the result of XORing the plaintext element plain[l] (stored in temp) with the value from S-box 330, S[t], (as shown in column 726). The resultant value of this XOR is the ciphertext.

In one embodiment, at process cycle sixteen, this resultant value is stored in ciphertext 334, cipher[ ], at an offset of l (as shown in column 732). FIG. 7 illustrates an overlap in the execution of the iterations of the while loop of FIG. 6, as the subsequent iteration of the while loop in FIG. 6 (denoted by parenthesized value in column 704) commences during process cycle eight of the current iteration. Accordingly, process cycle eight in the subsequent iteration provides the first available write operation after process cycle three (which needs to be completed to receive the value of the XOR operation). However, embodiments of the invention are not so limited. In another embodiment, this value can be written to cipher[ ] in a different process cycle. For example, with no overlapping of iterations of the while loop in FIG. 6, this value could be written to cipher[ ] in an earlier process cycle in the subsequent iteration, such as process cycle twelve. The process returns to process decision block 504, where a decision is made on whether the generation of the ciphertext is complete (as described above).

Moreover, at process cycle seven, as part of code statement 632, the value stored in l is incremented to proceed to the next element in plaintext 332 that will be converted to ciphertext (as shown in column 722). Also, at process cycle seven, as part of code statement 632, j1 is set to the value stored in j2. In particular, j1 is used in the subsequent iteration of FIG. 6 to assign a new value to j1 (see code statement 612) for the generation of the first byte of ciphertext in the next iteration (as shown in column 708).

As shown in waterfall diagram 700, with overlapping among iterations of the while loop of FIG. 6, the first and second cycles of the memory read operations (shown in columns 728 and 730, respectively) are not idle, as data is being accessed from memory 314 during each cycle of the two cycle memory read operations. Further, as described, a speculative load operation for the generation of a second portion of ciphertext (the speculative ciphertext block) is executed prior to the completion of a potentially conflicting store operation for the generation of a prior portion of ciphertext (the non-speculative ciphertext block). Accordingly, the bottlenecking of memory accesses related to the data ciphering operations is reduced as each read cycle for a process cycle is being employed to access data from memory. Additionally, as described, embodiments of the invention cipher data at a rate of approximately two bytes per eight process cycles.

Moreover, embodiments of the invention can vary the scheduling of the execution of the code statements shown in pseudo-code 600. For example, in an embodiment, if there is a collision between the first swap and the second memory read access, the next iteration of the while loop (in FIG. 6 or 7) could commence prior to the completion of the current iteration.

Additionally, as illustrated, embodiments of the invention can be used in conjunction with data ciphering operations wherein the iterations associated therein are weakly coupled. In particular, in an embodiment, the S-box includes 256 elements wherein only two of such elements change for a given generation of ciphertext. Accordingly, the speculative execution for the generation of an additional byte of ciphertext for a given iteration has a high probability for success.

System Description

Figure 9:
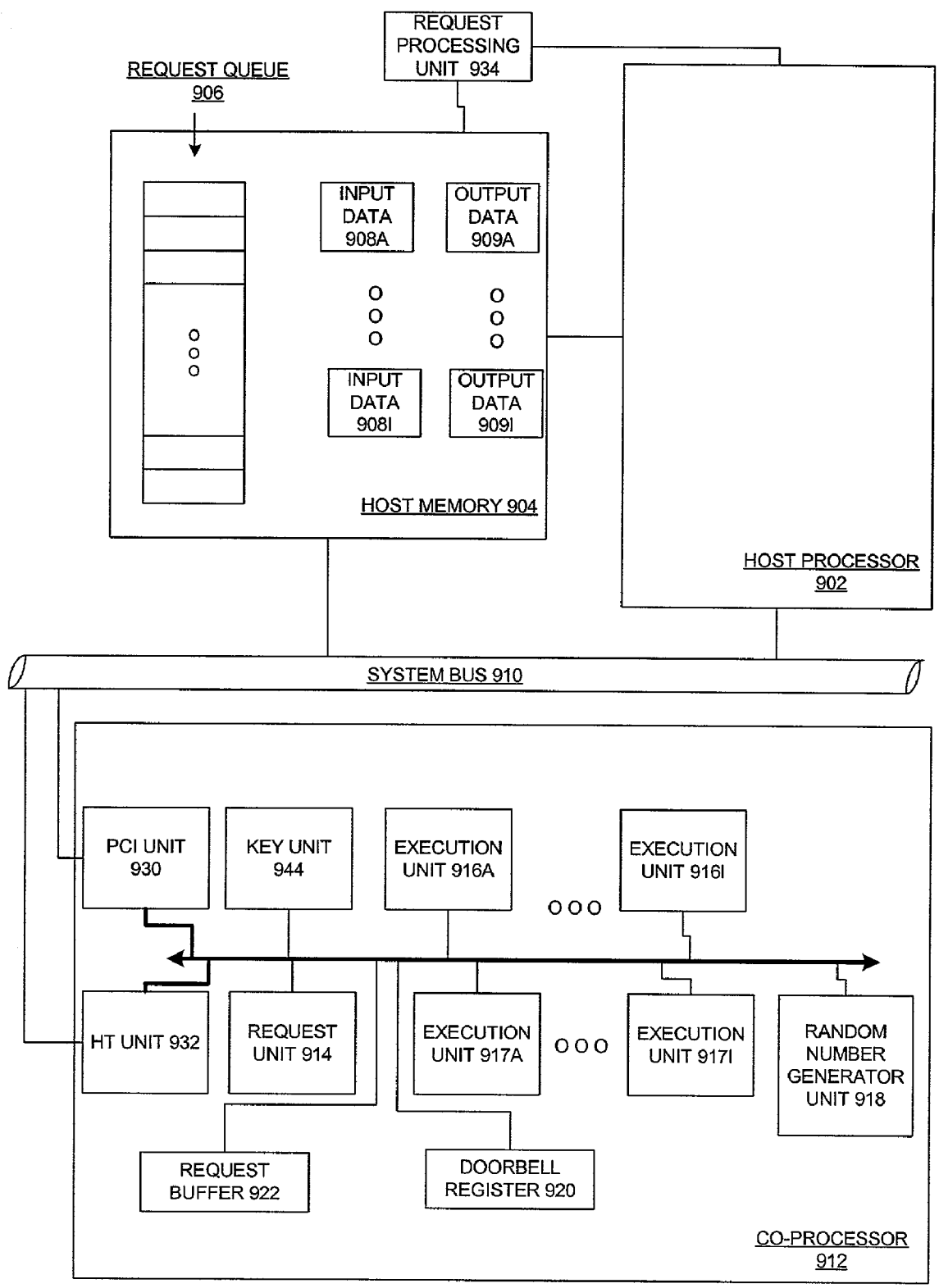
FIG. 9 is a block diagram illustrating a system for processing of security operations that includes speculative execution for data ciphering, according to one embodiment of the invention.

FIG. 9 is a block diagram illustrating a system for processing of security operations that includes speculative execution for data ciphering, according to one embodiment of the invention. FIG. 9 includes host processor 902, host memory 904, coprocessor 912 and request processing unit 934. Host processor 902, host memory 904 and coprocessor 912 are coupled to system bus 910. Additionally, host processor 902, host memory 904 and request processing unit 934 are coupled together. In an embodiment, request processing unit 934 can be a process or task that can reside within host memory 904 and/or host processor 902 and can be executed within host processor 902. For example, request processing unit 934 may be a driver for the coprocessor executed by the host processor, wherein the driver interfaces with Open SSL. However, embodiments of the invention are not so limited, as request processing unit 934 can be different types of hardware (such as digital logic) executing the processing described therein.

Host memory 904 stores request queue 906, input data 908A-908I and output data 909A-909I. Request queue 906 is illustrated and described in terms of a queue. However, embodiments of the invention are not so limited, as request queue 906 can be any other type of data structure for storage of requests to be transmitted to coprocessor 912, which is described in more detail below. In one embodiment, request queue 906 is a circular queue (ring buffer). In an embodiment, the write pointer for request queue 906 is maintained by request processing unit 934 and the read pointer for request queue 906 is maintained by request unit 914 of coprocessor 912. Accordingly, request processing unit 934 increments its write pointer when storing requests into request queue 906, while request unit 914 decrements its read pointer when extracting or retrieving requests from request queue 906.

Additionally, although input data 908A-908I and output data 909A-909I are data structures that are described as tables, such data can be stored in other types of data structures, such as data objects in an object-oriented environment. In one embodiment, input data 908A-908I are contiguously stored in host memory 904. Accordingly, request unit 914 within coprocessor 912 can extract the input data across multiple requests using one direct memory access (DMA) read operation.

Requests inserted into request queue 906 by request processing unit 934 can include instructions, such as an operation code, the data to be operated on as well as a pointer to other locations in host memory 904 storing data (which is related to the request) that could not be placed into the request inside request queue 906, due to restraints on the size of the requests. In particular, requests within request queue 906 can point to one of input data 908A-908I. In one embodiment, these requests are 32 bytes in size. The types of requests can comprise different security operations including, but not limited to, a request to (1) generate a random number, (2) generate a prime number, (3) perform modular exponentiation, (4) perform a hash operation, (5) generate keys for encryption/decryption, (6) perform a hash-message authentication code (H-MAC) operation, (7) perform a handshake hash operation and (8) perform a finish/verify operation.

Coprocessor 912 includes Peripheral Component Interconnect (PCI) unit 930, lightening data transport (LDT) unit 932, key unit 944, request unit 914, doorbell register 920, execution units 916A-916I, execution units 917A-917I, random number generator unit 918 and request buffer 922, which are coupled together. Additionally, PCI unit 930 and LDT unit 932 are coupled to system bus 910. PCI unit 930 and LDT unit 932 provide communication between the different components in coprocessor 912 and host memory 904, host processor 902 and request processing unit 934. While one embodiment is described in which PCI and LDT units are used to connect to a system bus, alternative embodiments could use different buses.

The number of execution units 916 and 917 and the number of random number generator units 918 are by way of example and not by way of limitation, as a lesser or greater number of such units can be included within coprocessor 912. In one embodiment, execution units 916-917 execute the data ciphering operations described above. For example, in an embodiment, execution unit 300 (illustrated in FIG. 3) is one of execution units 916-917. Random number generator unit 918 generates random numbers for the generation of keys. Key unit 944 can store keys locally within coprocessor 912 for execution units 917A-917I that can be subsequently used for processing of different security operations without requiring the retrieval of such keys from memory that is external to coprocessor 912. Request unit 914 extracts requests within request queue 906 based on values inserted into doorbell register 920 and distributes such requests to execution units 916-917 for processing, which is described in more detail below. Request buffer 922 can store the requests extracted by request unit 914 for processing by execution units 916-917. Further operations of the system illustrated in FIG. 9 are described in further detail in co-pending patent application, entitled "An Interface to a Security Co-Processor" Ser. No. 10/025,512 to Richard E. Kessler, David A. Carlson, Muhammad Raghib Hussain, Robert A. Sanzone and Khaja E. Ahmed.

Memory described herein includes a machine-readable medium on which is stored a set of instructions (i.e., software) embodying any one, or all, of the methodologies described herein. Software can reside, completely or at least partially, within this memory and/or within processors described herein. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc.

Thus, a method, apparatus and system for speculative execution for data ciphering have been described. Although the invention has been described with reference to specific exemplary embodiments, it will be evident that various modifications and changes may be made to these embodiments without departing from the broader spirit and scope of the invention. For example, embodiments of the invention were described such that two portions of the ciphertext are generated for a given iteration. However, in other embodiments, a greater number of portions of the ciphertext can be generated for a given iteration. For example, if a memory access included a four cycle latency, the memory pipeline can be fully utilized by generating four portions of ciphertext in a given iteration. Moreover, in an embodiment, the plaintext and ciphertext data structures could be stored contiguously within memory. Accordingly, a number of bytes from the plaintext data structure could be retrieved in a single memory access for use across a number of iterations. Additionally, a number of bytes could be stored into the ciphertext data structure in a single memory access that had been generated across a number of iterations. To further illustrate, embodiments of the invention described the generation of ciphertext based on bytes of the plaintext. However, embodiments of the invention are not so limited, as smaller and/or lesser portions of the plaintext can be used to generate the ciphertext. Accordingly, the specification and drawings are to be regarded in an illustrative rather than a restrictive sense.

What is claimed is:

1. A computer-implemented method executing in a processor, the method comprising:
receiving a request to perform for data ciphering of plaintext; and
processing the request based on a data structure stored in a memory coupled to the processor, wherein the processing comprises,
performing a first access of data from the data structure;
swapping the data from the first access;
data ciphering a first portion of the plaintext based on the swapped data from the first access;
performing a second access of data from the data structure prior to the swapping of the data from the first access;
performing the following, upon determining that the data from the first access does not equal the data from the second access,
swapping the data from the second access; and
data ciphering a second portion of the plaintext based on the swapped data from the second access in an iteration including data ciphering a first portion of the plaintext based on the swapped data from the first access; and
performing the following, upon determining that the data from the first access equals data from the second access,
reexecuting the performing of the second access of data from the data structure in an iteration that is subsequent to determining that the data from the first access does not equal the data from the second access;
swapping the data from the second access; and
data ciphering the second portion of the plaintext based on the swapped data from the second access.

2. The computer-implemented method of claim 1, wherein the data ciphering comprises an RC4 operation.

3. The computer-implemented method of claim 1, wherein the data structure comprises a substitution-box.

4. A co-processor coupled to a host processor and a host memory, the co-processor comprising:
an interface unit to retrieve a data encryption operation, a substitution (S)-box and plaintext associated with the data encryption operation from the host memory based on an instruction from the host processor; and
an execution unit coupled to the interface unit, the execution unit comprising,
a memory to store the plaintext and the S-box associated with the operation for the data cipher;
a microcontroller unit to schedule the data cipher operation; and
a RC4 unit to receive the data cipher operation, wherein the RC4 unit is to swap data stored in the S-box for data ciphering of a first portion of the plaintext wherein the RC4 unit is to read data stored in the S-box for data ciphering of a second portion of the plaintext, prior to completion of the swapping of data stored in the S-box for data ciphering of the first portion of the plaintext, and wherein the RC4 unit is to data cipher the second portion of the plaintext upon determining that the data being swapped in the S-box does not equal the data being read from the S-box.

5. The co-processor of claim 4, wherein the RC4 unit is to data cipher the first portion of the plaintext.

6. The co-processor of claim 4, wherein the RC4 unit is to swap data retrieved from the S-box for the data ciphering of the second portion of the plaintext upon determining that the data being swapped for the data ciphering of the first portion of the plaintext does not equal the data read from the S-box for data ciphering of the second portion of the plaintext.

7. A system comprising:
a host processor;
a host memory coupled to the host processor, the host memory to include a security operation, wherein the security operation includes a data cipher operation based on RC4, the host memory to include plaintext and a data structure for the data cipher operation;
a co-processor coupled to the host processor, the co-processor comprising,
an interface unit to retrieve the security operation from the host memory based on an instruction from the host processor;
an execution unit coupled to the interface unit, the execution unit comprising,
a memory to store the plaintext and the data structure associated with the data cipher operation;
a microcontroller unit to store the data cipher operation in an execution queue; and
an RC4 unit coupled to the execution queue, the RC4 unit to receive the data cipher operation, wherein the RC4 unit is to swap data stored in the S-box for data ciphering of a first portion of the plaintext and wherein the RC4 unit is to read data stored in the S-box for data ciphering of a second portion of the plaintext, prior to completion of the swapping of data stored in the S-box for data ciphering of the first portion of the plaintext, and wherein the RC4 unit is to swap data retrieved from the data structure for the data ciphering of the second portion of the plaintext upon determining that the data being swapped for the data ciphering of the first portion of the plaintext does not equal the data read from the data structure for data ciphering of the second portion of the plaintext.

8. The system of claim 7, wherein the RC4 unit is to data cipher the second portion of the plaintext upon determining that the data being swapped in the data structure does not equal the data being read from the data structure.

9. The system of claim 7, wherein the RC4 unit is to data cipher the first portion of the plaintext.

10. A machine-readable medium that provides instructions, which when executed by a machine, cause said machine to perform operations comprising:
receiving a request to perform data ciphering of plaintext; and
processing the request based on a data structure stored in a memory coupled to the processor, wherein the processing comprises,
performing a first access of data from the data structure;
swapping the data from the first access;
data ciphering a first portion of the plaintext based on the swapped data from the first access;
performing a second access of data from the data structure prior to the swapping of the data from the first access;

performing the following, upon determining that the data from the first access does not equal the data from the second access,
  swapping the data from the second access; and
  data ciphering a second portion of the plaintext based on the swapped data from the second access in an iteration including data ciphering a first portion of the plaintext based on the swapped data from the first access; and
performing the following, upon determining that the data from the first access equals data from the second access;
  reexecuting the performing of the second access of data from the data structure in an iteration that is subsequent to determining that the data from the first access does not equal the data from the second access;
  swapping the data from the second access; and
  data ciphering the second portion of the plaintext based on the swapped data from the second access.

11. The machine-readable medium of claim 10, wherein the data ciphering comprises an RC4 operation.

12. The machine-readable medium of claim 10, wherein the data structure comprises a substitution-box.

13. The machine-readable medium of claim 10, wherein processing the request for data ciphering of the plaintext comprises data ciphering the plaintext over a number of iterations and wherein the data ciphering of the first portion of the plaintext is in a same iteration as the data ciphering of the second portion of the plaintext.

* * * * *